(12) United States Patent  
Madsen et al.

(10) Patent No.: US 8,512,497 B2
(45) Date of Patent: Aug. 20, 2013

(54) AUTOMATED COMPOSITE ANNULAR STRUCTURE FORMING

(75) Inventors: Christopher J. Madsen, Ogden, UT (US); Eric McNabb, Syracuse, UT (US); John Schowengerdt, Salt Lake City, UT (US); John B. Healey, South Weber, UT (US); Todd Rosevear, Taylorsville, UT (US); Kevin Fehlmann, Centerville, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 0 days.

(21) Appl. No.: 13/606,424

(22) Filed: Sep. 7, 2012

(65) Prior Publication Data

US 2013/0000825 A1    Jan. 3, 2013

Related U.S. Application Data

(62) Division of application No. 12/615,908, filed on Nov. 10, 2009, now Pat. No. 8,282,757.

(51) Int. Cl.
*B32B 37/00* (2006.01)

(52) U.S. Cl.
USPC ............ 156/175; 156/173; 156/242; 156/245

(58) Field of Classification Search
USPC .................................. 156/173, 175, 242, 245
See application file for complete search history.

(56) References Cited

U.S. PATENT DOCUMENTS

| | | | |
|---|---|---|---|
| 1,452,742 A | 4/1923 | Johnston |
| 1,669,324 A | 5/1928 | Brown |
| 2,938,566 A | 5/1960 | Toulmin, Jr. |
| 2,979,431 A | 4/1961 | Perrault |
| 3,300,355 A | 1/1967 | Adams |
| 3,616,072 A | 10/1971 | Bostrom |
| 3,669,324 A | 6/1972 | Landoni |
| 3,962,394 A | 6/1976 | Hall |
| 3,995,080 A | 11/1976 | Cogburn et al. |
| 3,995,081 A | 11/1976 | Fant et al. |
| 4,151,031 A | 4/1979 | Goad et al. |
| 4,244,994 A | 1/1981 | Trainor et al. |
| 4,278,738 A | 7/1981 | Brax et al. |
| 4,310,132 A | 1/1982 | Frosch et al. |

(Continued)

FOREIGN PATENT DOCUMENTS

FR    1.554.899    1/1969
JP    U-58-39845    9/1981

(Continued)

OTHER PUBLICATIONS

European Search Report, European Patent Application EP 10186688. 7, Apr. 6, 2011.

(Continued)

*Primary Examiner* — Jeff Aftergut
(74) *Attorney, Agent, or Firm* — IPLM Group, P.A.

(57) ABSTRACT

Method and apparatus for forming an annular composite structure is provided. In one embodiment an apparatus for forming annular composite structures is provided. The apparatus includes an annular shaped tool and a forming head. The annular shaped tool includes a forming surface of a select cross-sectional geometry. The forming head is configured to form continuous ply layers one ply at a time circumferentially about the forming surface of the tool.

17 Claims, 13 Drawing Sheets

(56) References Cited

U.S. PATENT DOCUMENTS

| | | | |
|---|---|---|---|
| 4,357,193 A | 11/1982 | McGann et al. | |
| 4,410,383 A | 10/1983 | Lipari | |
| 4,475,976 A | 10/1984 | Mittelstadt et al. | |
| 4,519,285 A | 5/1985 | Dontscheff | |
| 4,548,859 A | 10/1985 | Kline et al. | |
| 4,559,005 A | 12/1985 | Gants et al. | |
| 4,622,091 A * | 11/1986 | Letterman | 156/286 |
| 4,861,406 A | 8/1989 | Baker et al. | |
| 4,946,526 A | 8/1990 | Petty-Galis et al. | |
| 4,997,510 A | 3/1991 | Shinno et al. | |
| 5,026,447 A | 6/1991 | O'Connor | |
| 5,039,371 A | 8/1991 | Cremens et al. | |
| 5,043,128 A | 8/1991 | Umeda | |
| 5,076,873 A | 12/1991 | Lowery | |
| 5,076,880 A | 12/1991 | Spengler et al. | |
| 5,102,609 A | 4/1992 | Miller et al. | |
| 5,137,071 A | 8/1992 | Ashton et al. | |
| 5,151,236 A | 9/1992 | Azzara et al. | |
| 5,182,060 A | 1/1993 | Berecz | |
| 5,211,901 A | 5/1993 | Fray | |
| 5,292,475 A | 3/1994 | Mead et al. | |
| 5,368,807 A * | 11/1994 | Lindsay | 264/510 |
| 5,451,377 A | 9/1995 | Asher et al. | |
| 5,484,277 A | 1/1996 | Lindsay | |
| 5,502,886 A | 4/1996 | Jensen et al. | |
| 5,538,589 A | 7/1996 | Jensen et al. | |
| 5,543,199 A | 8/1996 | Fell | |
| 5,593,633 A * | 1/1997 | Dull et al. | 264/510 |
| 5,609,806 A | 3/1997 | Walsh et al. | |
| 5,632,940 A | 5/1997 | Whatley | |
| 5,639,410 A | 6/1997 | Amaike et al. | |
| 5,681,513 A | 10/1997 | Farley | |
| 5,688,577 A | 11/1997 | Smith et al. | |
| 5,707,576 A | 1/1998 | Asher | |
| 5,738,749 A | 4/1998 | Grimshaw et al. | |
| 5,792,487 A | 8/1998 | Wenning et al. | |
| 5,820,804 A | 10/1998 | Elmaleh | |
| 5,882,462 A | 3/1999 | Donecker et al. | |
| 5,891,379 A | 4/1999 | Bhattacharyya et al. | |
| 5,954,917 A | 9/1999 | Jackson et al. | |
| 5,959,031 A | 9/1999 | Thurgood | |
| 6,027,786 A | 2/2000 | Ford | |
| 6,071,458 A | 6/2000 | Mossi | |
| 6,096,669 A | 8/2000 | Colegrove et al. | |
| 6,114,012 A | 9/2000 | Amaoka et al. | |
| 6,164,604 A | 12/2000 | Cirino et al. | |
| 6,355,133 B1 | 3/2002 | Williams | |
| 6,413,461 B1 | 7/2002 | Kobayashi et al. | |
| 6,432,236 B1 | 8/2002 | Leemon et al. | |
| 6,540,867 B1 | 4/2003 | Cochran | |
| 6,544,366 B2 | 4/2003 | Hamilton et al. | |
| 6,699,419 B1 | 3/2004 | Kia et al. | |
| 6,702,970 B2 | 3/2004 | Klug | |
| 6,739,861 B2 | 5/2004 | Cournoyer et al. | |
| 6,743,127 B2 | 6/2004 | Eggiman et al. | |
| 6,998,165 B2 | 2/2006 | Howland | |
| 7,138,167 B2 | 11/2006 | Sakonjo et al. | |
| 7,175,795 B2 | 2/2007 | Eberth et al. | |
| 7,249,943 B2 | 7/2007 | Benson et al. | |
| 7,335,012 B2 | 2/2008 | Blanton et al. | |
| 7,469,735 B2 | 12/2008 | Brown et al. | |
| 7,513,769 B2 | 4/2009 | Benson et al. | |
| 7,527,222 B2 | 5/2009 | Biornstad et al. | |
| 7,767,128 B2 | 8/2010 | Benson et al. | |
| 7,820,092 B2 | 10/2010 | Benson et al. | |
| 7,824,171 B2 | 11/2010 | Hanson et al. | |
| 8,282,757 B2 | 10/2012 | Madsen et al. | |
| 8,366,981 B2 | 2/2013 | Benson et al. | |
| 2001/0001409 A1 | 5/2001 | Weight et al. | |
| 2002/0144401 A1 | 10/2002 | Nogueroles Vines et al. | |
| 2003/0079825 A1 | 5/2003 | Gardner et al. | |
| 2004/0145095 A1 | 7/2004 | McCollum et al. | |
| 2005/0056362 A1 * | 3/2005 | Benson et al. | 156/163 |
| 2005/0144780 A1 | 7/2005 | Hishimoto et al. | |
| 2005/0144870 A1 | 7/2005 | Hishimoto et al. | |
| 2006/0249868 A1 | 11/2006 | Brown et al. | |
| 2007/0289699 A1 | 12/2007 | Benson et al. | |
| 2008/0054122 A1 | 3/2008 | Bold | |
| 2009/0044914 A1 | 2/2009 | Pham et al. | |
| 2009/0071592 A1 | 3/2009 | Benson et al. | |
| 2009/0071597 A1 | 3/2009 | Benson et al. | |
| 2009/0078362 A1 | 3/2009 | Wilkerson et al. | |
| 2009/0081443 A1 | 3/2009 | Benson et al. | |
| 2009/0110879 A1 | 4/2009 | Lewis et al. | |
| 2009/0130450 A1 | 5/2009 | Anderson et al. | |
| 2009/0176066 A1 | 7/2009 | Darrow et al. | |
| 2010/0166998 A1 | 7/2010 | Bannister et al. | |
| 2010/0266833 A1 | 10/2010 | Day et al. | |
| 2011/0000311 A1 | 1/2011 | Petroff | |
| 2011/0111148 A1 | 5/2011 | Madsen et al. | |

FOREIGN PATENT DOCUMENTS

| | | |
|---|---|---|
| JP | 62-119027 | 5/1987 |
| JP | 64-004315 | 9/1989 |
| JP | 03-083624 | 4/1991 |
| JP | 03-126532 | 5/1991 |
| JP | 04-062142 | 2/1992 |
| JP | 05-050571 | 3/1993 |
| JP | 10-315339 | 2/1998 |
| JP | 2008-184155 | 8/2008 |
| JP | 2008-184156 | 8/2008 |
| WO | WO 99/52698 | 10/1999 |
| WO | WO 00/37244 | 6/2000 |
| WO | WO 2005/011961 A1 | 2/2005 |
| WO | WO 2006/119002 A2 | 11/2006 |
| WO | WO 2007/018935 A1 | 2/2007 |
| WO | WO 2008/019894 A1 | 2/2008 |
| WO | WO 2009/049737 A1 | 4/2009 |
| WO | WO 2009/052598 A2 | 4/2009 |
| WO | WO 2009/088699 A1 | 7/2009 |

OTHER PUBLICATIONS

PCT International Search Report, for International Application U.S. Appl. No. PCT/US2004/024960, dated Dec. 13, 2004.

Composite Systems, Inc., PFE_Technology, <http://www.compositemfg.com/FRE%20Technology.htm>, 2003, 2 pages.

\* cited by examiner

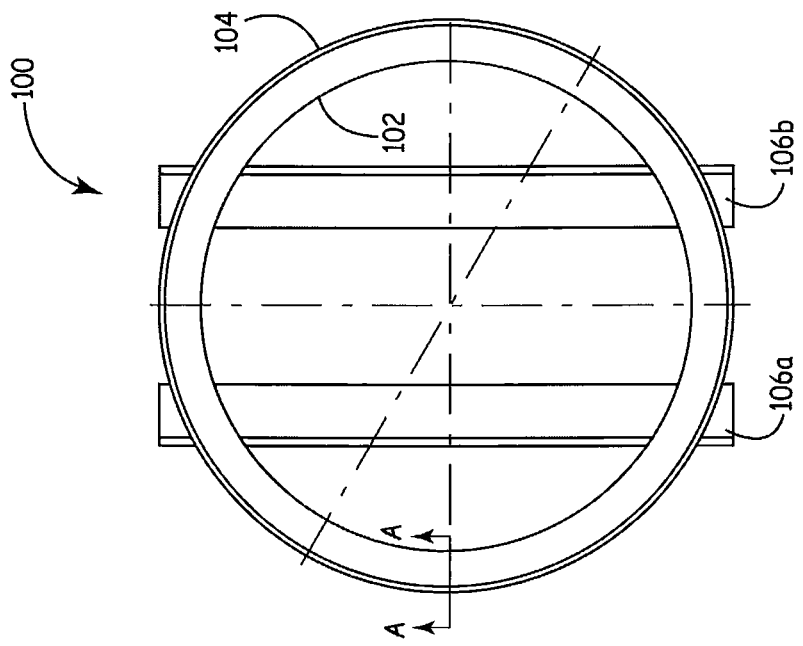
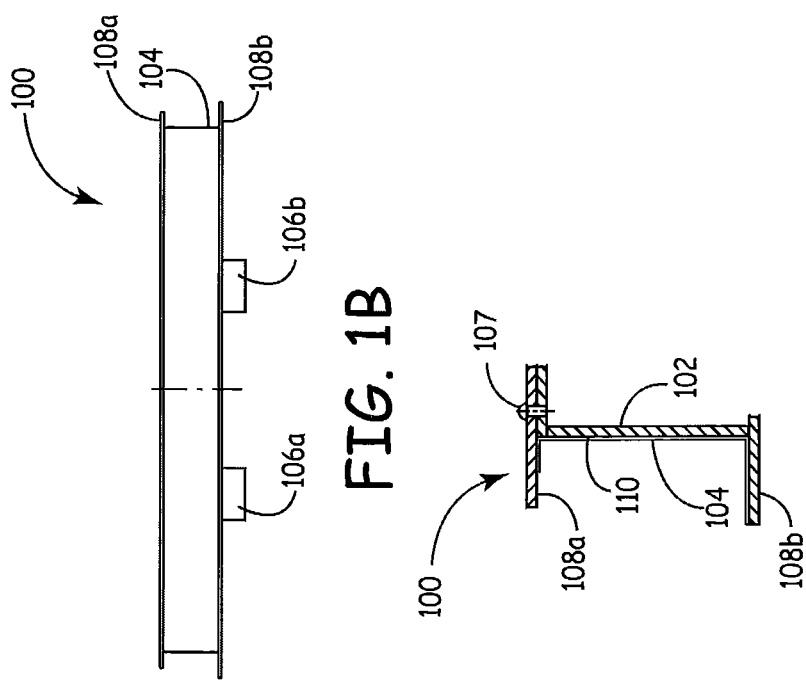

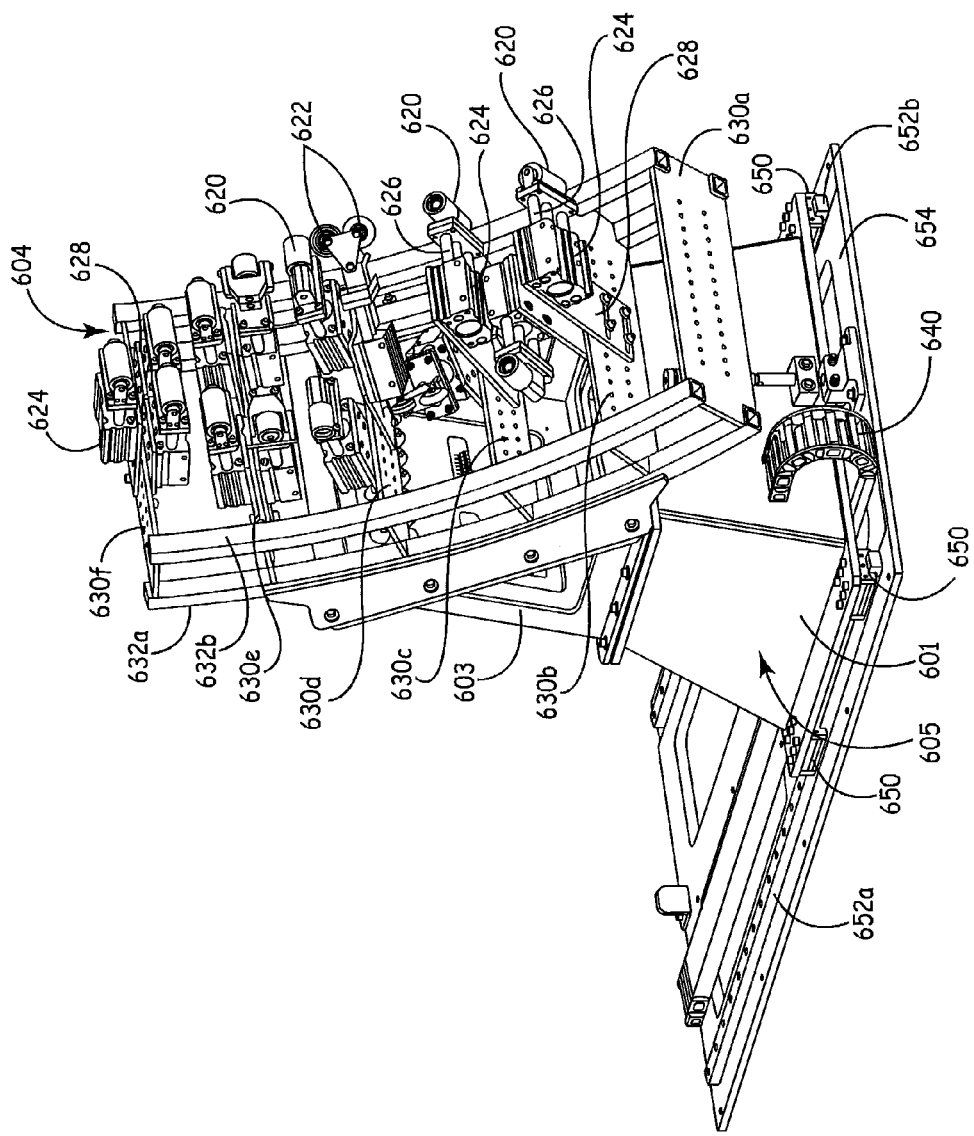

AUTOMATED COMPOSITE ANNULAR STRUCTURE FORMING

CROSS-REFERENCE TO RELATED APPLICATION

This application is a Divisional of U.S. application Ser. No. 12/615,908, filed Nov. 10, 2009, now U.S. Pat. No. 8,282,757, which is herein incorporated in its entirety by reference.

BACKGROUND

In the industry, including aerospace applications there is a need for light weight, high strength structures. To meet these requirements, fiber reinforced composite materials are often used. However, composites structures made from the fiber reinforced composite materials having certain shapes are difficult to fabricate with desired strength characteristics. For example, annular shaped composite structures are typically made by hand lay-up using intermediate debulkings. This is a costly process that takes a significant amount of time to complete with often less than desired results.

For the reasons stated above and for other reasons stated below which will become apparent to those skilled in the art upon reading and understanding the present specification, there is a need in the art for an efficient and effective method and system for forming annular shaped composite structures with desired characteristics.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of forming an annular composite structure is provided. The method includes: applying continuous ply layers one at time on a forming surface of an annular tool that has a select cross-sectional geometry and forming the ply layers on the full circumference annular tool with a forming head.

BRIEF DESCRIPTION OF THE DRAWINGS

The present invention can be more easily understood and further advantages and uses thereof more readily apparent, when considered in view of the detailed description and the following figures in which:

FIG. 1B is a side view of the tool of FIG. 1A;

FIG. 1C is a top view of the tool of FIG. 1C;

FIG. 1D is a cross-sectional side view along line AA of FIG. 1C;

FIG. 6A is a side perspective view of a forming head and forming head base of another embodiment of a tool and forming structure of the present invention;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a method and system to manufacture stiffened closed annular structures out of fiber reinforced composites. The machine process allow for the automated forming of continuous or discontinuous material into stiffened annular structures on constant cross section, including partial plies in local locations. Embodiments further allow for a continuous wrapping process of the material to lay up a full circumferential ply with roller compaction and forming on a ply by ply basis. This allows automated manufacture and produces a part with superior specific strength characteristics at a lower cost than a hand lay-up without the need for intermediate debulks. Materials used to form the composite structures are generally described as ply layers. The ply layers can be made of any materials that exhibit desired characteristics including but not limited to prepreg material and dry fiber material. The prepreg material and the dry fiber material can include, but is not limited to tapes, woven fabrics, non-woven fabrics and non-crimp fabrics.

Figure 1A:
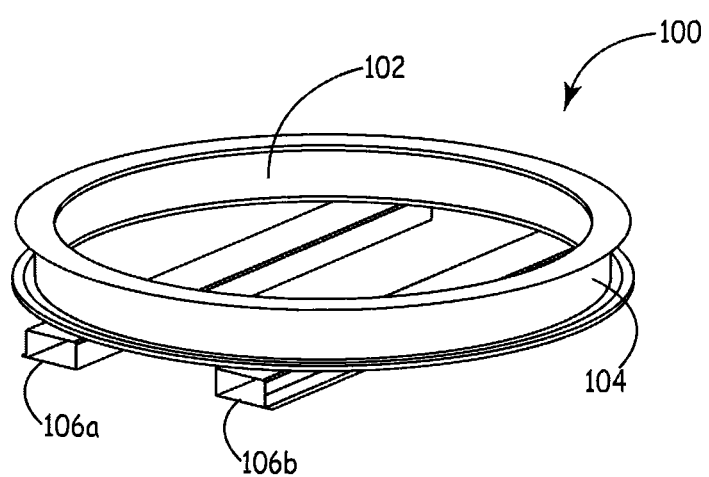
FIG. 1A is an isometric view of an annular shaped tool of one embodiment of the present invention.
Figures 1E, 1F, 1G:
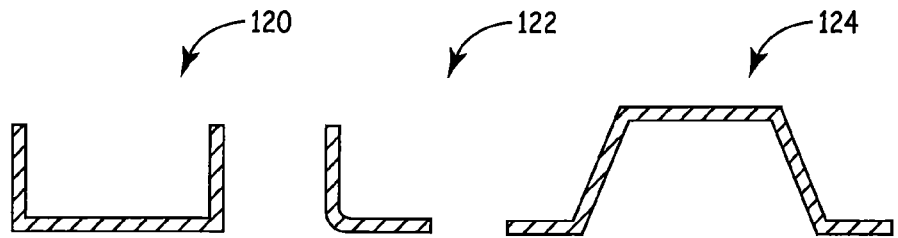
FIGS. 1E through 1I are cross-sectional side views of formed annular composite structures illustrating possible cross-sectional geometries.
Figures 1H, 1I:
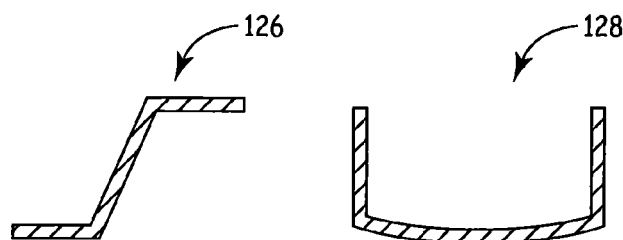
Figures 1J, 1K, 1L:
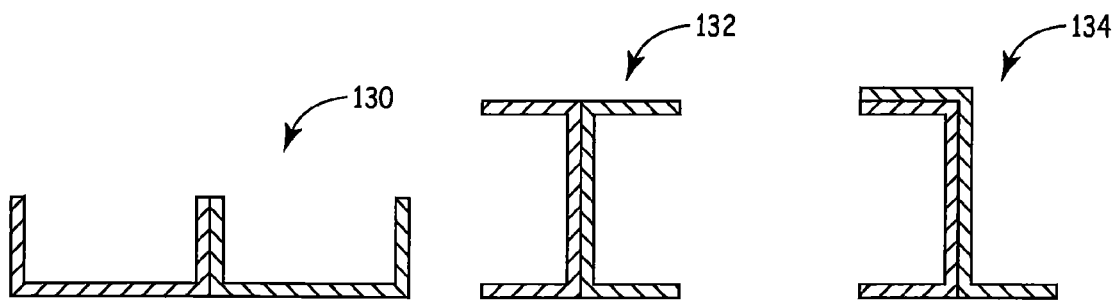
FIGS. 1J through 1L are cross-sectional side views of more than one formed annular composite structure coupled together.

Referring to FIG. 1A, an isometric view of an annular shaped tool 100 of an embodiment is illustrated. Tool 100 includes an inner surface 102, and an outer surface 104. In this embodiment, the tool 100 is resting on lifting pockets 106a and 106b. The lifting pockets 106a and 106b allow for the tool to be moved with heavy equipment moving vehicles such as a fork lift. A side view of the tool 100 is illustrated in FIG. 1B. As illustrated, the outer surface 104 of this embodiment of the tool 100 includes flange 108a and 108b. The outer surface 104 and flanges 108a and 108b form a forming surface of the tool 100. FIG. 1C of the top view of the tool 100. As illustrated the tool 100 in this embodiment is annular shaped. FIG. 1D illustrates a cross-sectional view of tool 100 along line AA of FIG. 1C. In this illustration a composite material lay-up 110 is shown on the forming surface made of outer surface 104 and flanges 108a and 108b of the tool 100. Moreover, in this embodiment tool 100 is designed to be taken apart for part extraction purposes. In particular, in this embodiment flange 108a is separated from the remaining portion of the tool 100 by the removal of fasteners 107 that are spaced along the tool 100 once the composite material lay-up 110 has been formed and cured. This allows for the easy extraction of formed composite structures from the tool 100. As illustrated, the cross-sectional geometry of the composite material lay-up is in the form of a C-shape. However, any cross-sectional geometry is contemplated and the present invention is not limited to C-shapes. That is, the forming surface of the tool can have any cross-sectional geometry desired to form composite structures having desired cross-sectional geometries. For example, possible cross-sectional geometries 120, 122, 124, 126 and 128 of formed full circumference composite structures are illustrated in FIGS. 1E, 1F, 1G, 1H and 1I. Moreover, the cross-sectional geometries 130, 132 and 134 can also be formed by coupling two or more full circumference composite structures as illustrated in FIGS. 1J, 1K and 1L. Hence, the present invention is not limited to specific cross-sectional geometries.

Figure 2A:
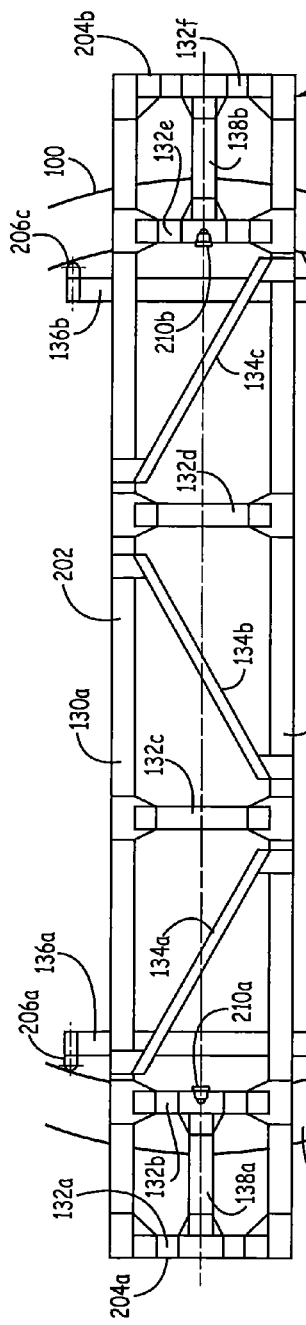
FIG. 2A is a top view of a bridge coupled to the tool of one embodiment of the present invention.
Figure 2B:
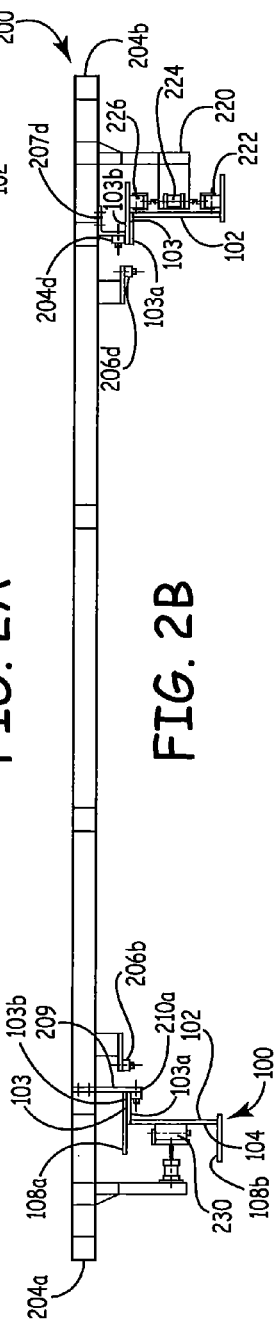
FIG. 2B is a side view of the bridge and tool of FIG. 2A.
Figure 2C:
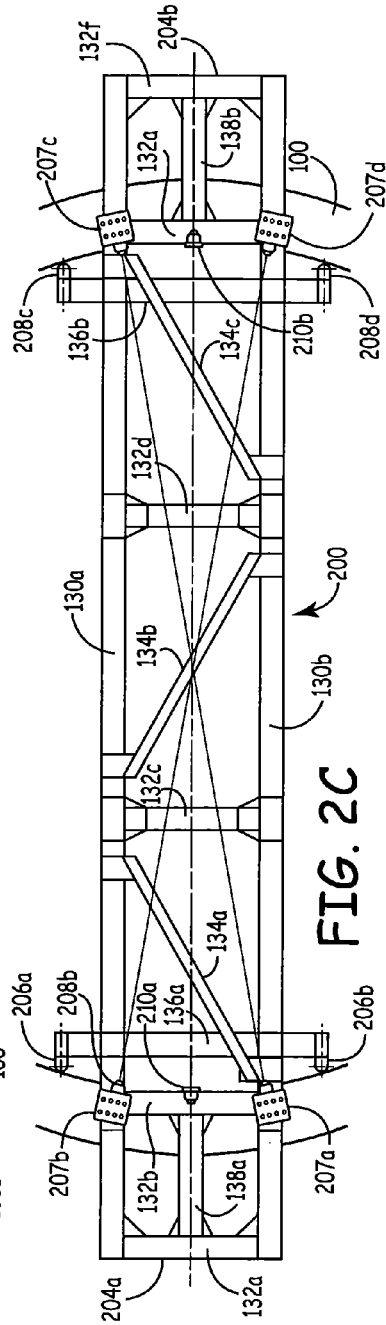
FIG. 2C is another top view of a bridge and tool of an embodiment.

FIGS. 2A, 2B, and 2C illustrate one embodiment of a mechanism used to apply the composite material lay-up to the tool 100. In particular, FIG. 2A illustrates a top view of a bridge rotationally coupled to tool 100. The bridge includes bridge frame 202. Frame 202 has a first rail 130a and a second rail 130b. The first and the second rails 130a and 130b extend beyond a diameter of the tool 100 in this embodiment. The first rail 130a is spaced from the second rail 130b by spacing members 132a, 132b, 132c, 132d, 132e and 132f. Supports 134a, 134b, 134c are further added between rails 130a and 130b to add additional support to the bridge frame 202. The bridge 200 has a first end 204a and a second end 204b. In this embodiment, spacing member 132a is proximate the first end 204a of the bridge and spacing member 132f is proximate the second end 204b of the bridge 200. Further illustrated in FIG. 2a is attaching supports 138a positioned between spacing member 132a and 132b and attaching support 138b, attached between spacing members 132e and 132f. Further attached to the frame 202 of the bridge 200 is guide roller supports 136a and 136b each of the guide roller supports 136a, 136b extends across a width of the frame 202 defined by rails 130a and 130b. At the end of each guide roller support 136a and 136b is attached a respective guide roller 206a, 206b, 206c, and 206d. The guide rollers 206a, 206b, 206c and 206d are designed to engage the inner surface 102 of the tool 100. In particular, the guide rollers 206a, 206b, 206c and 206d guide the bridge tool 100 as it rotates about tool 100. In one embodiment, the guide roller supports 136a and 136b are adjustable so that different diameters of the inner surface of the frame can be accommodated.

Figure 3A:
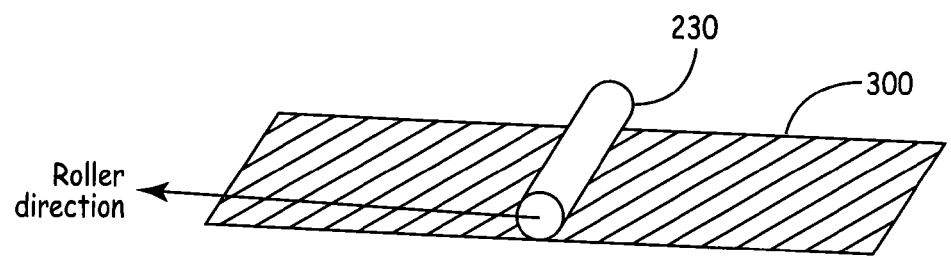
FIG. 3A is an illustration of a roller compacting a ply layer in a first direction of an embodiment of the present invention.
Figure 3B:
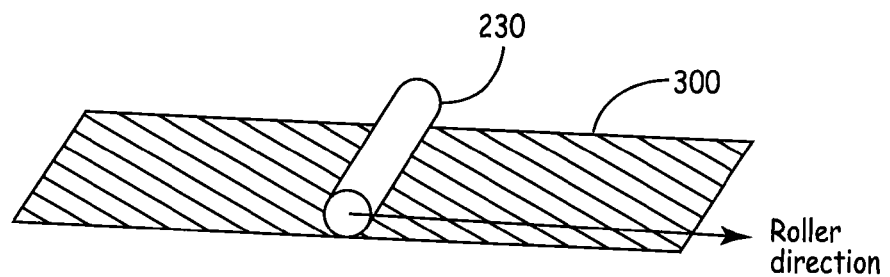
FIG. 3B is an illustration of the roller compacting the ply layer in a second direction of an embodiment of the present invention.

FIG. 2B and FIG. 2C further illustrate how the bridge 200 is rotationally coupled to the tool 100. In particular, FIG. 2B illustrates a cross-sectional side view of the tool 100 with the bridge 200 coupled thereto and FIG. 2C is another top view of the bridge 200 on the tool 100. As illustrated, the bridge 200 includes a plurality of trap rollers 210a and 210b and support rollers 208a, 208b, 208c and 208d. The trap rollers 210a and 210b are coupled to the frame 202 via trap roller support members 209. The trap rollers 210a and 210b engage a first surface 103a of a lip 103 extending from the inner surface of the tool 100. Meanwhile the support rollers 208a, 208b, 208c, and 208d engage a second surface 103b of the lip 103 of the tool. Hence, the lip 103 of the tool 100 is coupled between the guide rollers 210a and 210b and the support rollers 208a, 208b, 208c and 208d. The support rollers 208a, 208b, 208c and 208d are coupled to the frame 202 of the bridge 200 via support brackets 207a, 207b, 207c, and 207d. The trap rollers 210a and 210b and support rollers 208a, 208b, 208c and 208d maintain the bridge 200 on the tool 100 as the bridge 200 rotates about the tool. Coupled proximate the second end of the bridge 200 is a forming head 220. This forming head 220 is illustrated as including rollers 222, 224 and 226. The forming head 220 applies and simultaneously forms continuous ply layers one at a time on the forming surface of the tool 100. Further discussion of the forming head 220 is discussed below. Proximate the first end 204a of the bridge 200 is coupled a compaction roller 230. The compaction roller 230 is used to compact the ply layers on the forming surface of the tool 100. The bridge 200 can be rotated in relation to the tool in two directions. Hence, once a layer of ply has been formed on the forming surface of the tool 100 with the bridge 200 rotating in a first direction in relation to the tool 100, the bridge 200 can be reversed in direction in relation to the tool 100 so that the compaction roller 230 can be applied in two directions as illustrated in FIGS. 3A and 3B. In particular, FIG. 3A illustrates compaction roller 230 compacting ply layer 300 in a first direction and FIG. 3B illustrates compaction roller 230 compacting ply layer 300 in a second direction. Although FIGS. 2A, 2B and 2C illustrate the use of the bridge 200 forming a composite material on an outer forming surface of the tool 100 the same principles can be applied to a forming surface that was formed on the inner surface of tool 100. Hence in this embodiment (not shown), the forming head 200 attached to the frame 202 of the bridge would be proximate the inside surface of the tool 100. Accordingly, the present invention is not limited to forming surfaces on the outside of the tool 100.

Figure 4:
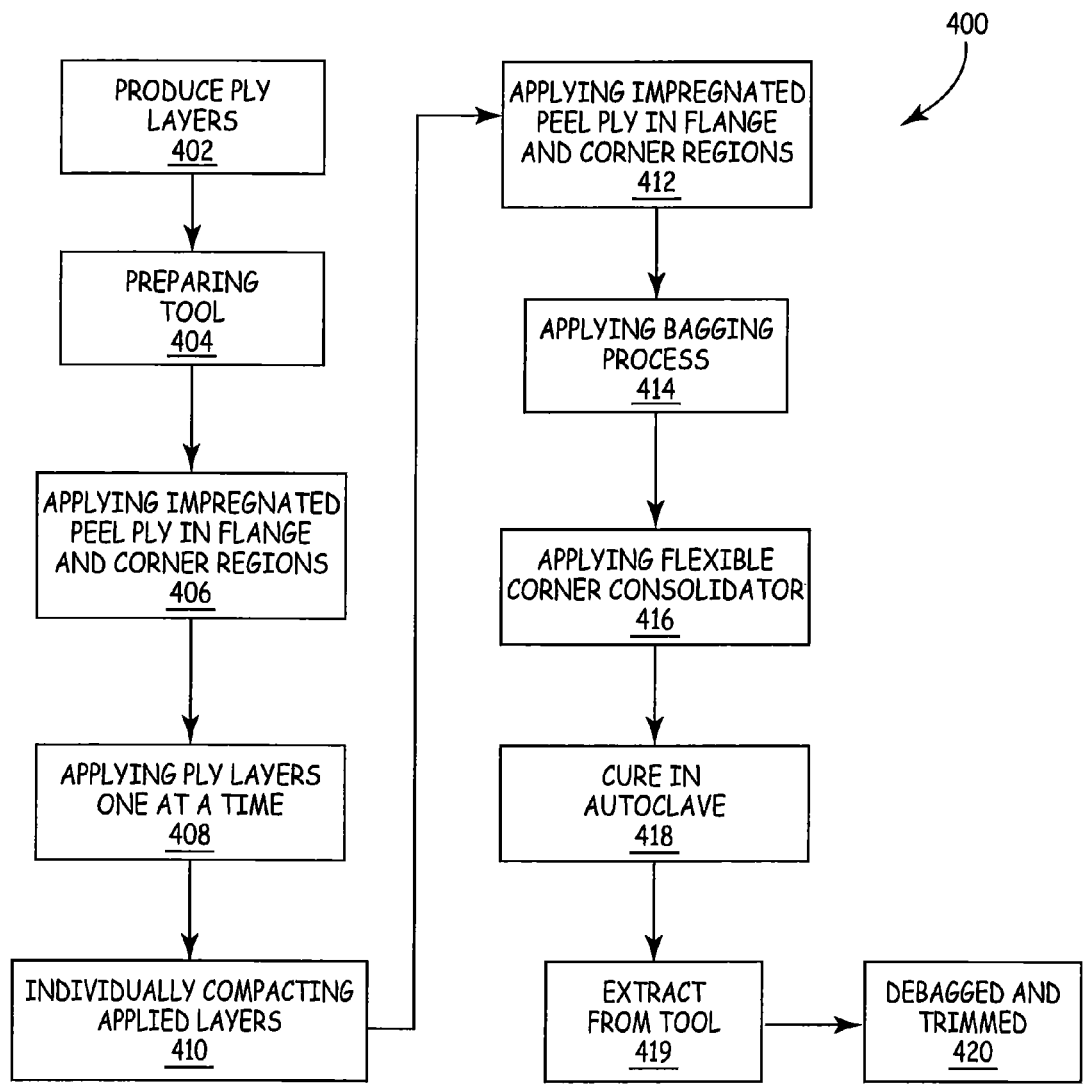
FIG. 4 is a forming flow diagram of one embodiment of the present invention.

Referring to FIG. 4, a forming flow diagram 400 of one embodiment is illustrated. Flow diagram 400 in this embodiment starts by first producing a ply layer (402). In one embodiment the ply layers are created by cutting a feed stock to achieve a desired fiber angle orientation. The cut section of fiber are then spliced together to form a ply layer having a desired angle orientation and a desired length. The flat ply layer is then typically rolled up on a supply roll until ready for use. In one embodiment the width of the ply roll is cut to the full tool width. Hence, in this embodiment the plies are continuous from flange edge to flange edge. Next, the tool 100 is prepared (404). In one embodiment the tool is prepared by applying a release coating that allows the formed composite part to be extracted from the tool 100. Next, an impregnated peel ply is applied to desired areas of the forming surface of the tool 100 in one embodiment (406). In one embodiment, the tool is heated to enhance the tack of the ply layer on the tool 100. The ply layers are then applied to the forming surface with the forming head 220 one ply layer at a time (408). In one embodiment, the material is continuously wound about the tool. The forming head 220 applies each ply layer at a balanced, symmetric, quasi-isotropic lay up in one embodiment. Moreover, the forming head 220 applies and simultaneously forms the ply layers on the forming surface of the tool 100. In one embodiment, the ply layers are applied by hand and the forming head 220 forms the layers. The ply layers are individually compacted with the rollers of the forming head (410). In one embodiment, ply ends circumferentially overlap each other by 25.4 millimeters. In one embodiment a peel ply is applied to corners and flanges on the laminates outer face to control resin richness (412). Next, a bagging process is applied at (414). Further in an embodiment, a corner consolidator is used on at least one corner (416). The bagged part is then cured in an autoclave under select heat and pressure (418). Once the part has been cured, the formed composite structure is extracted from the tool (410). The final part is then debagged and trimmed (420). In one embodiment, the bridge 200 is used in the trimming process.

Figure 5A:
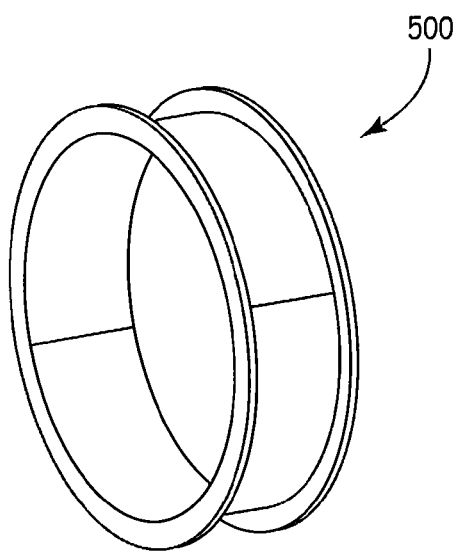
FIGS. 5A and 5B are illustrations of a formed composite structures of embodiments of the present invention.
Figure 5B:
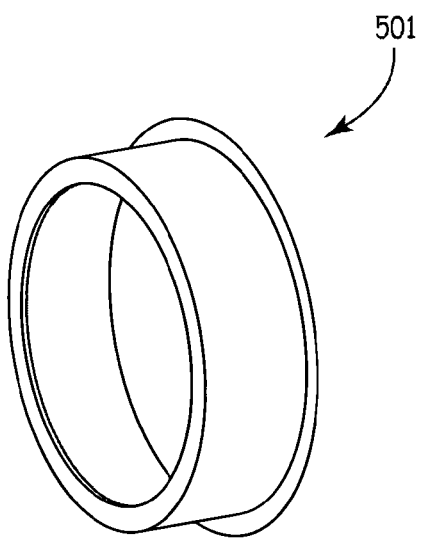

FIGS. 5A and 5B illustrate formed composite structures 500 and 501 created with a tool similar to tool 100 (described above) or tool 600 (described below). As illustrated, in these examples, the composites structures 500 and 501 are generally circular (annular) with composite structure 500 having C-shape cross-sectional geometry and composite structure 501 having a Z-shaped cross-sectional geometry. Although FIGS. 2A, 2B, and 2C illustrate a forming head 220 being attached to a bridge 200 that rotates in relation to the tool 100 in other embodiments the forming head is stationary and the tool moves. For example, referring to FIG. 6A, a forming head 604 on a forming head base 602 is illustrated. In this embodiment, the forming head base 602 includes a base plate 654 that engages a surface upon which the forming head base 602 is resting. Attached to the base plate 654 is a cable track 640 and elongated members 652a and 652b. A first base support 601 of base 602 is slideably coupled to base plate 654. In particular, guides (or slides) 650 coupled to the first base support 601 of the forming head base 602 slideably engage elongated members 652a and 652b to control movement of the base support 601 in relation to the base plate 654 of the base 602. Cable track 640 is used to move the first base support 601 in relation to the base plate 654 of the base 602. This movement allows the forming head 604 to move towards and away from a tool as discussed further below.

The first base support 601 is coupled to a second base support 603 in this embodiment of the forming head base 602. The second base support 603 in turn is coupled to the forming head 604. The forming head 604 is generally C-shaped in this embodiment. In this embodiment, the forming head 604 includes curved elongated frame members 632a, 632b, 632c and 632d. Coupled between frame members 632a, 632b, 632c and 632d are attaching plates 630a, 630b, 630c, 630d, 630e and 630f. Brackets 628 are selectively coupled to the attaching plates 603a, 630b, 630c, 630d, 630e and 630f. Air cylinder bodies 624 (of air cylinders) are coupled to the brackets 628 at select locations. Hence, the positioning of the rollers 620 and 622 to specific locations can be achieved with this arrangement. Rods 626 (of the air cylinders) selectively extend out from each respective air cylinder body 624 to engage the respective forming rollers 620 and 622 with the forming surface of the tool. In particular, the air cylinder bodies 624 exert a select force on ply layers with the respective forming rollers 620 and 622 to form the ply layers on the forming surface of the tool. An example force exerted is 100 lbs. In an embodiment, once the forming of the ply layers has been complete, rods 626 are then retracted into their respective air cylinder bodies 624.

Figure 6B:
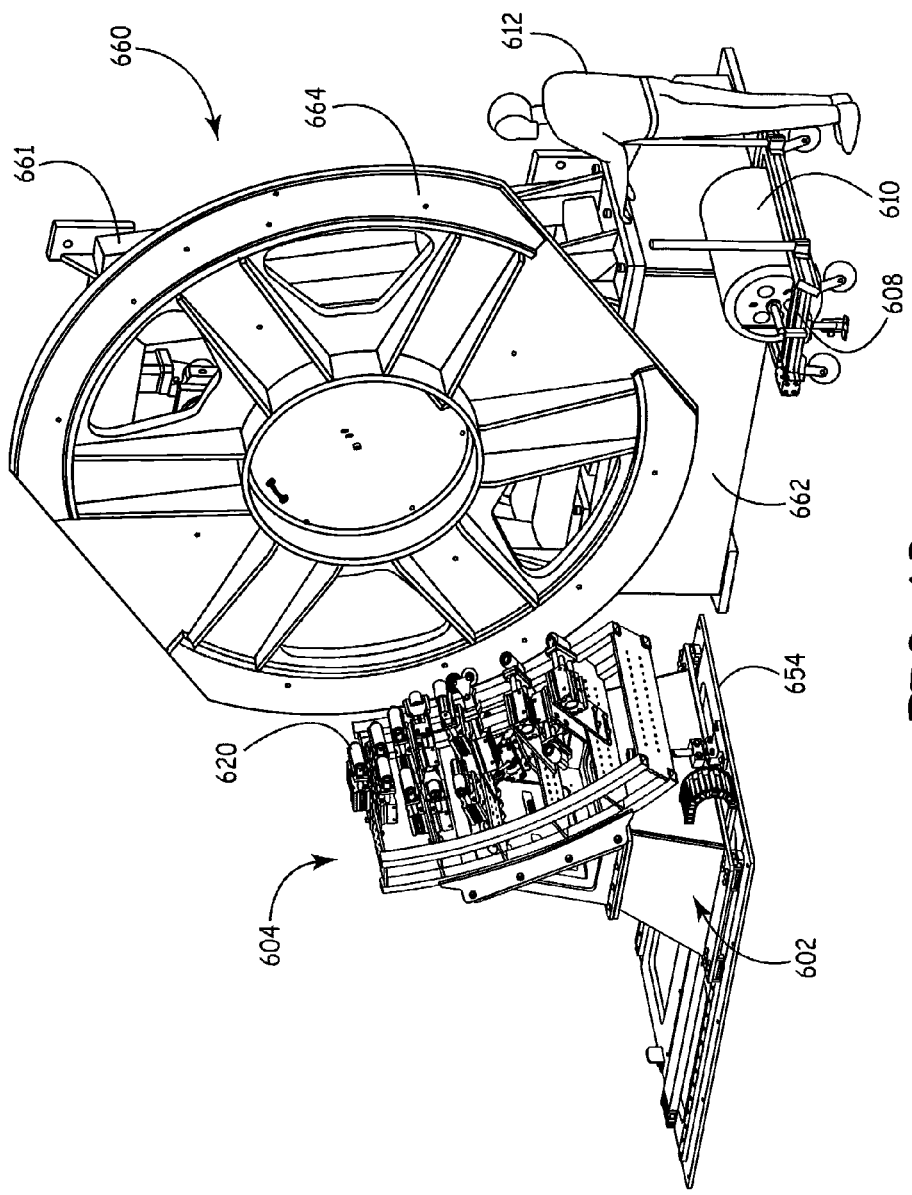
FIG. 6B is an illustration of the forming head, a tool handling assembly, and a material supply assembly of an embodiment of the present invention.
Figure 6C:
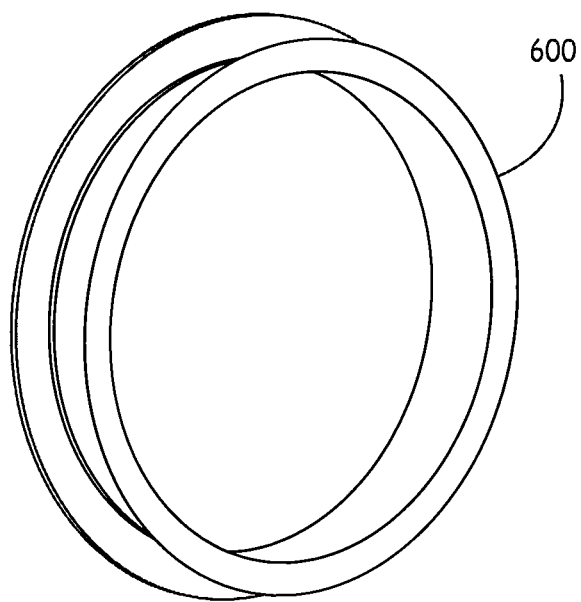
FIG. 6C is a side perspective view of another tool of an embodiment of the present invention.
Figure 6D:
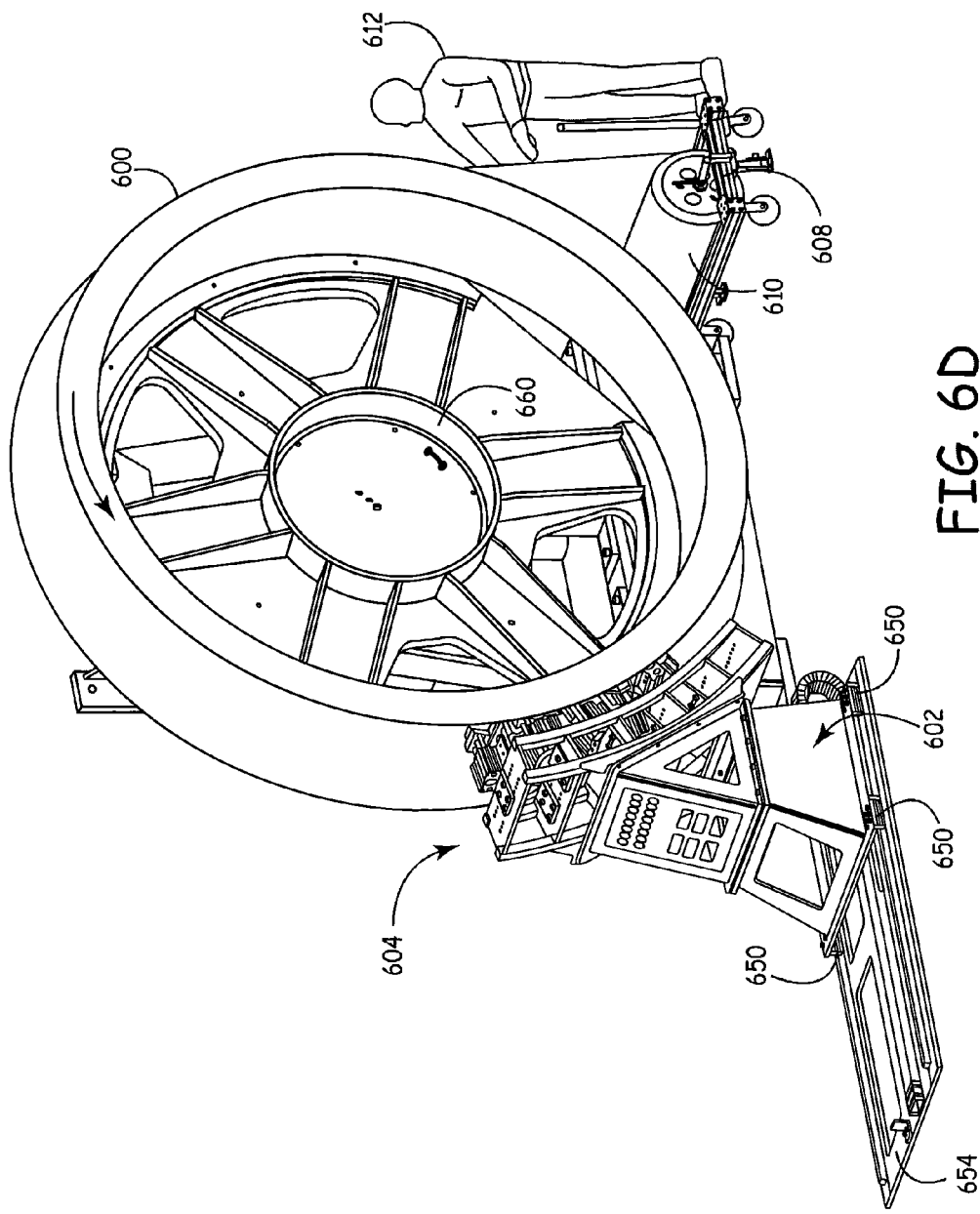
FIG. 6D is a side perspective view of the tool of FIG. 6D mounted on the tool handling assembly of FIG. 6B.
Figure 6E:
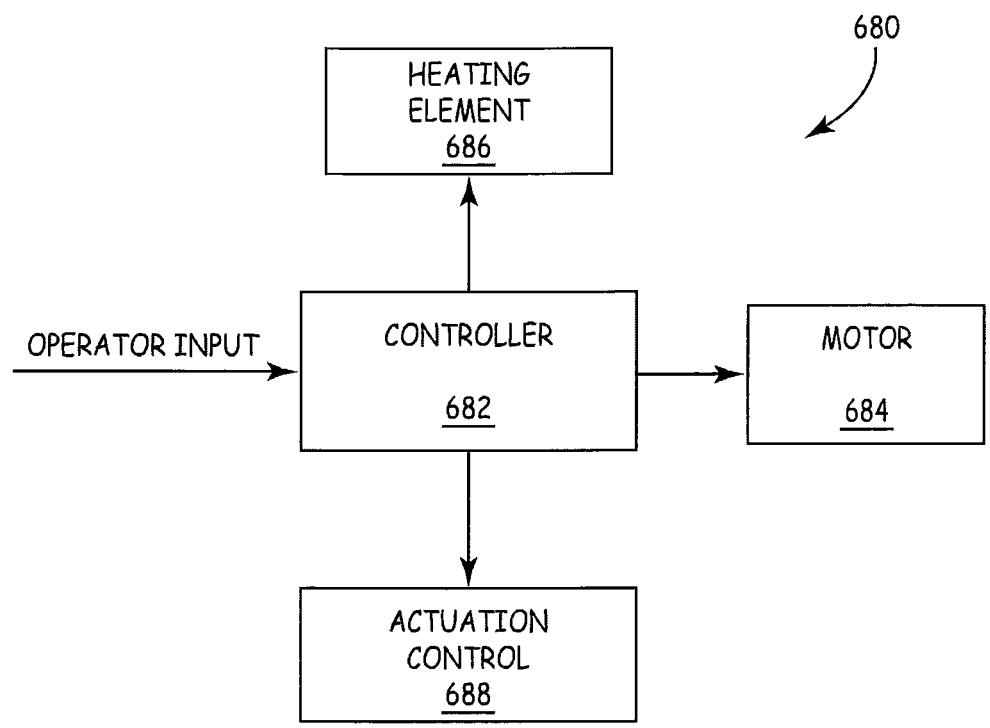
FIG. 6E is a block diagram of a control system of one embodiment of the present invention.

Referring to FIG. 6B an illustration of forming head 604, a tool handling assembly 660 and a material supply assembly 608 of one embodiment is shown. The tool handling assembly 660 includes a tool holding base 662 upon which a tool handling support 661 extends. A tool attaching member 664 is rotationally coupled to the tool attaching support 661. A motor (not shown) rotates the tool attaching member 664 in relation to the tool holding support 661 of the tool holding assembly 660 at a select angular velocity. The material supply assembly 608 rotationally holds a roll of material 610 which is placed on a tool by an operator 612 in this embodiment. An example of a tool 600 is illustrated in FIG. 6C. Tool 600 is mounted on tool attaching member 664 of the tool holding assembly 660 is illustrated in FIG. 6D. FIG. 6D illustrates the applying and forming of the material on the tool 600 in this embodiment. As illustrated, the tool 600 rotates on the tool holding assembly 660 as the operator 612 applies the material (ply layer) to the tool 600. The forming head 604 that includes the forming rollers 620 and 622 form the ply layer on the tool 600. Once, the ply layers have been formed, the forming head 604 is pulled back from the tool 600 via slides 650. The tool 100 with the formed ply layers 610 can then be removed for curing. FIG. 6E illustrates, a block diagram of a control system 680 used to operate the composite forming apparatus as illustrated in FIG. 6D. As illustrated, a controller 682 receives input from an operator such as, but not limited to, how many revolutions should be made with the tool 600 before stopping and the angular velocity of the tool 600 during the revolutions. In response to the operator inputs, the controller 682 controls the motor 684 to achieve the desired performance. The controller 682 in this embodiment also controls a heating element 686 used to heat the ply fibers and/or tool to help adhesion of the ply on the tool. The heating element 686 can be any type of heating element including, but not limited to, a convection heating element, an infrared heating element and a conduction heating element. The controller 682 in this embodiment is also in communication with an actuation control 688. The actuation control 688 is coupled to control each of the actuators 624 discussed above. Hence, the controller 682 in response to an operators input directs the actuation control 688 to move the air cylinders 626 of respective actuators 624 accordingly.

Figure 7:
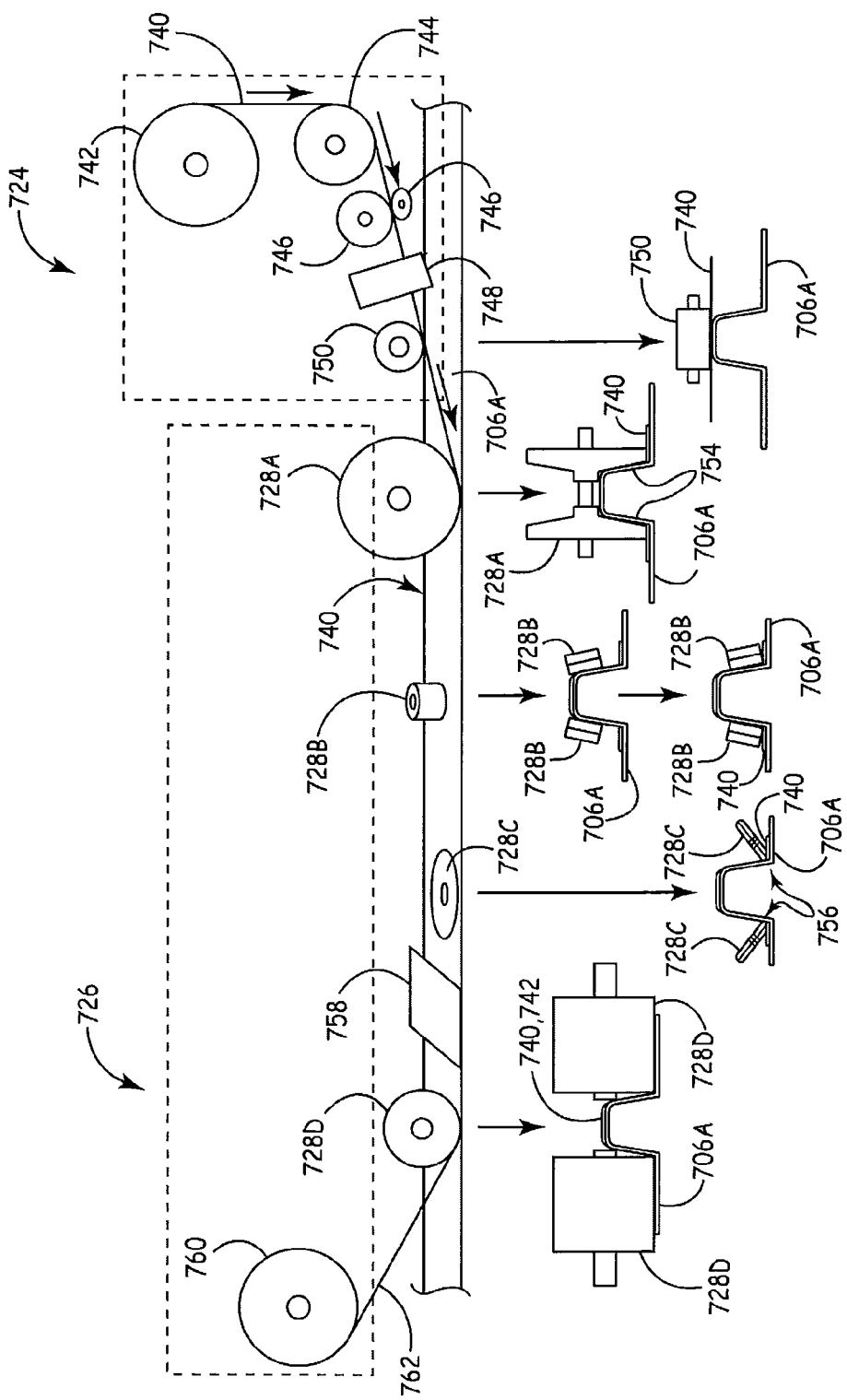
FIG. 7 is an illustration of a forming of one embodiment of the present invention.

As discussed above, embodiments of the present invention use a forming head. Another example of a forming head that includes an automatic ply feeder (dispensing device 724) can be found in commonly assigned U.S. Pat. No. 7,513,769 (Benson et al.) filed on Jul. 30, 2004, entitled "Apparatus and Methods for Forming Composite Stiffeners and Reinforcing Structures" which is herein incorporated by reference. A description of a forming head is shown in the schematic diagram of FIG. 7. In particular, FIG. 7 provides an exemplary example of a material dispensing device 724 and the forming head 726. Material 740 (e.g., a ply layer or prepreg cloth) is fed from a supply and tension roller 742 and over a redirect roller 744 as motivated by a pair of feed rollers 746. The material 740 passes beyond a cutting device 748 which may be used to cut the material to a specified length, width, or both such as described hereinabove with respect to other embodiments of the present invention. The material 740 is then disposed onto a portion of a tool 706A by a tack roller 750.

It is noted that the tack roller 750 (and subsequent rollers encountered by the material 740) is shown in a first elevational view with a second, rotated elevational view depicted immediately therebeneath to provide additional understanding of how the material 740 is being shaped by the interaction of various rollers with the material 740 and the underlying tool 706A.

The forming head 726 includes a plurality of rollers 728A-728D used to shape and debulk material 740 disposed over the tool 706A (or over previously shaped material plies disposed on the tool 706A). Thus, for example, a first roller 728A engages the tool 706A to generally conform the material 740 to the shape of the tool 706A. Second, a set of rollers 728B may be used to press the material against the side walls 754 of the tool 706A. If desired, this may be accomplished with multiple sets of rollers 728B working from the upper portion of the tool 706A to the bottom portion as depicted in the rotated elevational views of the rollers 728B. Another set of rollers 728C may be used to press the material 740 into the interior lower corners 756 of the tool 706A. A squeegee 758 (or shoe) may be used to help pull wrinkles from the material at one or more intermediate locations among the rollers 728A-728D. Finally a set of rollers 728D may be used to press and form the flange members of the composite structure 702.

It is noted that the process of forming the composite structure 702 includes forming, shaping and debulking the material 740 from the inside out. In other words, the tack roller 750 applies pressure to the tool 706A and material 740 disposed thereon at the center, with subsequent rollers 728A-728D each sequentially applying pressure at a location further towards the outer edges of the material 740. Such a process has been determined to be efficient and effective in removing wrinkles and air gaps between laminar plies of material thereby producing a highly consolidated and debulked composite member.

A take-up roller 760 may be associated with the forming head 726 (or independently coupled with the carriage assembly 710) to collect carrier material 762 (also referred to as backing) which may be disposed on a surface of, for example, a prepreg material used to form the composite structure 702. The carrier material 762, which may include a suitable polymer material, not only keeps the prepreg material from adhering to itself when in rolled form (i.e., such as when on supply and tension roller 742) but also may remain on the material 740 while the material 740 is being shaped, formed and debulked so that the various rollers 750 and 728A-728D do not stick to the material 740 or collect and build-up resin of a surface thereof. Additionally, the presence of such carrier material 762 may serve to protect the material 740 used to form a composite structure 702 when the various rollers 728 press and rub against the material 740 during forming of the composite structure 702.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of forming an annular composite structure, the method comprising:
applying at least one continuous ply layer on a forming surface of an annular tool that has a select cross-sectional geometry; and
forming the at least one ply layer on the full circumference annular tool with a forming head that has at least one frame member that is curved to match the contour of the annular tool.

2. The method of claim 1, further comprising:
compacting the at least one ply layer on the tool.

3. The method of claim 1, wherein the forming head includes at least one roller conformed to a surface of the tool.

4. The method of claim 1, wherein the forming head includes at least one squeegee to smooth out the at least one ply layer.

5. The method of claim 1, further comprising:
producing a roll of ply having a select orientation.

6. The method of claim 1, further comprising one of applying the at least one ply layer by hand to the forming surface of the tool and automatically applying the at least one ply layer to the forming surface of the tool with the forming head.

7. The method of claim 1, further comprising:
preparing the tool with a release coating to allow for composite structure extraction.

8. The method of the claim 1, further comprising:
moving the forming head relative to the tool in forming the at least one ply layer.

9. The method of claim 1, further comprising:
moving the tool relative to the forming head in forming the at least one ply layer.

10. The method of claim 1, further comprising:
circumferentially overlapping ends of ply layers.

11. The method of claim 1, further comprising:
continuously winding more than one layer of ply on the forming surface of a full circumference annular tool.

12. The method of claim 1, further comprising:
applying a bagging process;
applying heat and pressure with an autoclave to cure the at least one ply layer;
extracting formed composite structure from the tool; and
debagging and trimming the composite structure after the curing.

13. The method of claim 1, wherein the at least one ply layer is formed from one of prepreg fiber material and dry fiber material.

14. The method of claim 13, wherein the material is at least one of tape, woven fabric, non-woven fabric and non-crimp fabric.

15. The method of claim 1, further comprising:
assembling at least two formed composite structures together to form a desired cross-sectional geometry.

16. A method of forming an annular composite structure, the method comprising:
applying continuous ply layers at least one at time on a forming surface of an annular tool that has a select cross-sectional geometry; and
engaging the ply layers with a plurality of rollers mounted on a forming head that has at least one member that is curved to match the contour of the annular tool to position each roller in a desired location to form the ply layers to the forming surface of the tool.

17. A method of forming an annular composite structure, the method comprising:
applying continuous ply layers at least one at time on a forming surface of an annular tool that has a select cross-sectional geometry; and
engaging the ply layers with a plurality of rollers mounted on a generally C-shaped forming head that is curved to match the contour of the annular tool to position each roller in a desired location to form the ply layers to the forming surface of the tool.

* * * * *